United States Patent [19]

Shimazaki

[11] Patent Number: 5,530,561
[45] Date of Patent: Jun. 25, 1996

[54] METHOD OF AND APPARATUS FOR BINARIZING IMAGE SIGNAL

[75] Inventor: Osamu Shimazaki, Kanagawa, Japan

[73] Assignee: Fuji Photo Film Co., Ltd., Kanagawa, Japan

[21] Appl. No.: 409,605

[22] Filed: Mar. 24, 1995

[30] Foreign Application Priority Data

Apr. 15, 1994 [JP] Japan .................................. 6-077480

[51] Int. Cl.$^6$ .............................. H04N 1/40; H04N 1/405
[52] U.S. Cl. .......................... 358/455; 358/465; 358/466
[58] Field of Search ..................................... 358/455, 456, 358/457, 458, 465, 466; 382/270, 252

[56] References Cited

U.S. PATENT DOCUMENTS

| | | | |
|---|---|---|---|
| 4,654,721 | 3/1987 | Goertzel et al. | 358/456 |
| 5,107,346 | 4/1992 | Bowers et al. | 358/458 |
| 5,210,602 | 5/1993 | Mintzer | 358/456 |

Primary Examiner—Scott A. Rogers
Attorney, Agent, or Firm—Sughrue, Mion, Zinn, Macpeak & Seas

[57] ABSTRACT

To obtain a binary gradation image from a continuous gradation image, a multi-valued image signal I(x,y) is compared with a threshold signal TH by a comparator to produce a binary image signal P(x,y), an error signal E(x,y) is determined from the binary image signal P(x,y) and the multi-valued image signal I(x,y), and the error signal E(x,y) is multiplied by an error diffusion coefficient W(k,l) to produce a diffusion error signals ΔE(x,y). A random number R(x,y) generated by a random number generator and a weighting coefficient f(I(x,y)) generated as a function of an image signal by a weighting coefficient generator are multiplied, and the product is added to the diffusion error signals ΔE(x,y). The sum is added to the multi-valued image signal I(x,y) thereby to produce a corrected multi-valued image signal I(x,y), which is then compared with the threshold signal TH by the comparator thereby generating a binary image signal P(x,y).

10 Claims, 3 Drawing Sheets

METHOD OF AND APPARATUS FOR BINARIZING IMAGE SIGNAL

BACKGROUND OF THE INVENTION

1. Field of the Invention

The present invention relates to a method and an apparatus for binarizing an image signal based on a randomization error diffusion process, and more particularly to a method and an apparatus for binarizing an image signal based on weighting randomization patterns in the conversion process.

2. Description of the Related Art

For reproducing a gradation image on a display unit or a printer which is capable of displaying only binary representations, a multi-valued image signal is converted into a binary image signal made up of only 0s and 1s. There is a known error diffusion process for binarizing a multi-valued image signal.

According to the error diffusion process, when a multi-valued image signal representing an input pixel is converted into a binary image signal by comparison with a threshold signal, an error produced by the binarization is distributed and added to pixels in the vicinity of the input pixel, and resultant multi-valued image signals are successively binarized as new multi-valued image signals representing those pixels.

If it is assumed that a multi-valued image signal representing an input pixel (x,y) is represented by I(x,y) (x indicates the position in a main scanning direction and y indicates the position in an auxiliary scanning direction) and a binary image signal converted from the multi-valued image signal is represented by P(x,y), then a binarization error signal E(x,y) is expressed by:

$$E(x,y) = I(x,y) - P(x,y) \qquad (1)$$

The binarization error signal E(x,y) determined according to the equation (1) is diffused by being added to multi-valued image signals I(x−k,y−l) (k,l are 0 or ±1) representing eight pixels around the pixel (x,y) under consideration, according to the equations (2):

$$I(x+1,y) = I(x+1,y) + E(x,y) \times A,$$

$$I(x-1,y+1) = I(x-1,y+1) + E(x,y) \times B,$$

$$I(x,y+1) = I(x,y+1) + E(x,y) \times C,$$

$$I(x+1,y+1) = I(x+1,y+1) + E(x,y) \times D \qquad (2)$$

where A, B, C, D are error diffusion coefficients for diffusing the binarization error signal E(x,y) at certain ratios. While only four of the eight pixels around the pixel (x,y) under consideration are involved in the equations (2), the same calculations are also effected on the other four pixels that are positioned in point-symmetry relation to the above four pixels with respect to the pixel (x,y). The resultant multi-valued image signals I(x−k,y−l) are then converted into respective binary image signals P(x−k,y−l) by comparison with a given threshold signal. The above calculating procedure is repeated until a certain finishing condition is satisfied.

The equations (2) are mathematically equivalent to the following equation (2'):

$$I(x,y) = I(x,y) + \sum_{k}^{} \sum_{l}^{} W(k,l) \cdot E(x-k, y-l) \qquad (2')$$

where W(k,l) represents an error diffusion coefficient which is indicated by A, B, C, D in the equations (2).

The above error diffusion process for converting multi-valued image signals into binary image signals is effective in reproducing continuous gradation signals representing half-tone-dot images or photographic images while suppressing the generation of moiré patterns. However, the error diffusion process is disadvantageous in that it allows an undesirable texture (fine periodical pattern), such as a striped pattern peculiar to a binarized image or a matted area in a region of certain density level, to be generated in a binarized image depending on the manner in which the error diffusion coefficients A, B, C, D are established.

To avoid the above shortcomings, there has been proposed a process (hereinafter referred to as a "randomization error diffusion process") of changing the error diffusion coefficients A, B, C, D at random using random numbers and applying the changed error diffusion coefficients A, B, C, D to the binarization error signal E(x,y) to reproduce an image that is less susceptible to an undesirable texture. For details, see the Journal of Image Electronics Society, Vol. 20, No. 5, 1991, pages 443–449.

The proposed randomization error diffusion process has a problem in that since the image signals of pixels in regions free from an undesirable texture, e.g., in low- and high-density regions, are also processed with random numbers, the coarseness of the image increases in these regions.

SUMMARY OF THE INVENTION

It is therefore an object of the present invention to provide a method of and an apparatus for binarizing a continuous gradation image signal based on a randomization error diffusion process to produce a binary gradation image which is less susceptible to an undesirable texture and free from coarseness.

To achieve the above object, there is provided in accordance with the present invention an apparatus for producing a binary gradation image signal from a continuous gradation image signal, comprising comparing means for comparing a multi-valued image signal with a threshold signal to produce a binary image signal, error signal calculating means for determining an error signal based on the difference between the multi-valued image signal and the binary image signal, error diffusion processing means for determining a set of error diffusion signals based on the error signal and a set of error diffusion coefficients, and applying the error diffusion signals to pixels in the vicinity of the input pixel, random number generating means for generating a random number, weighting coefficient generating means for generating a weighting coefficient whose value varies depending on a density value of an input multi-valued image signal, and random number weighting means for multiplying the random number by the weighting coefficient, the arrangement being such that the random number weighted by the weighting coefficient is applied to randomize at least one of the following: the error signal, the error diffusion signals, and the threshold signal.

The error diffusion process may be randomized by either means for multiplying the error diffusion coefficient by the weighted random number, or means for adding the weighted random number to the result of the error diffusion process.

The error signal or the threshold signal may be randomized by means for adding the weighted random number to the error signal or the threshold signal.

According to the present invention, there is also provided a method of producing a binary gradation image signal from a continuous gradation image signal, comprising the steps of comparing a multi-valued image signal with a threshold signal thereby to produce a binary image signal, determining an error signal based on the difference between the multi-valued image signal and the binary image signal, determining a set of error diffusion signals based on the error signal and a set of error diffusion coefficients, applying the error diffusion signals to pixels in the vicinity of the input pixel thereby to carry out an error diffusion process, generating a random number, generating a weighting coefficient whose value varies depending on a density value of an input multi-valued image signal, weighting the random number with the weighting coefficient, and applying the random number weighted by the weighting coefficient to randomize at least one of the following the error signal, the error diffusion signals, and the threshold signal.

The error diffusion process may be randomized by either multiplying the error diffusion coefficient by the weighted random number or adding the weighted random number to the result of the error diffusion process.

The error signal or the threshold signal may be randomized by adding the weighted random number to the error signal or the threshold signal.

With the method and apparatus according to the present invention, when a multi-valued image signal is compared with a predetermined signal to produce a binary image signal, and the difference between the binary image signal and the multi-valued image signal is used as an error signal to correct multi-valued image signals of other pixels, the regularity of an error diffusion coefficient for diffusing the error signal into image signals of surrounding pixels is randomized by a random number, and the degree of randomization thereof is established depending on the multi-valued image signal. Accordingly, an undesirable texture is prevented from being generated in a resultant image in given density regions, and the image is free of coarseness.

Rather than controlling the error signal and the error diffusion coefficient, the threshold signal may be randomized, and the degree of randomization thereof may be established depending on the multi-valued image signal.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
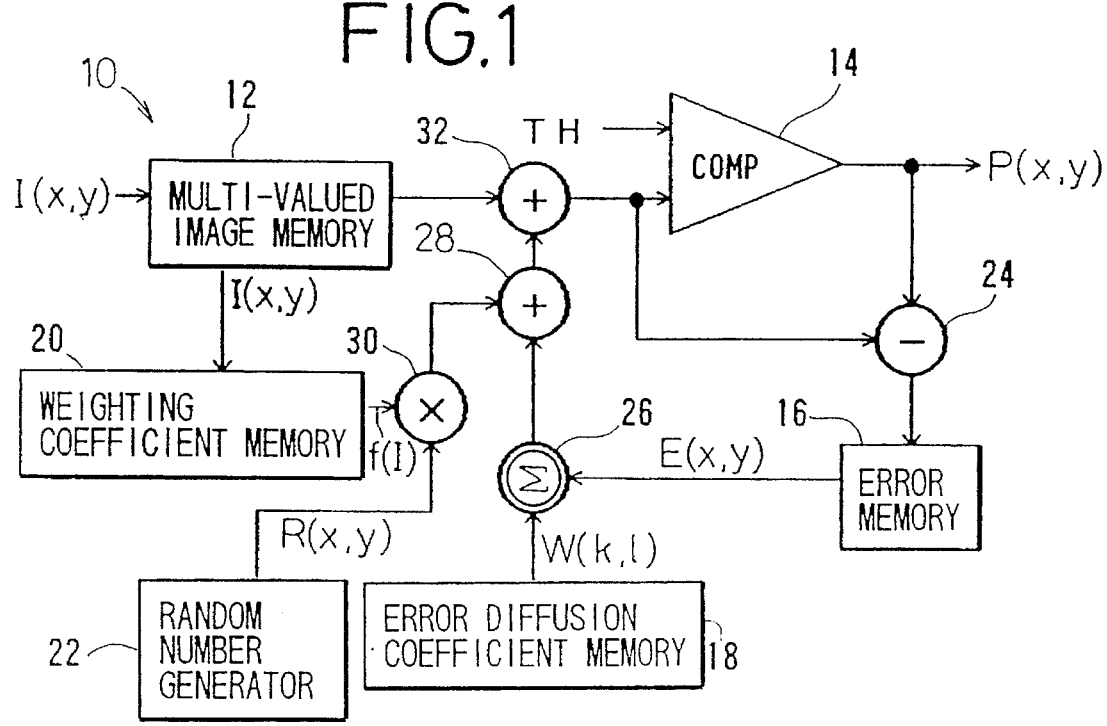
FIG. 1 is a block diagram of an error diffusing circuit in an apparatus for binarizing an image signal according to an embodiment of the present invention.

FIG. 1 shows in block form an error diffusing circuit 10 in an apparatus for binarizing an image signal according to an embodiment of the present invention.

As shown in FIG. 1, the error diffusing circuit 10 generally comprises a multi-valued image memory 12 for storing a multi-valued image signal $I(x,y)$, a comparator 14 (comparing means) for comparing the multi-valued image signal $I(x,y)$ with a threshold signal TH to produce a binary image signal $P(x,y)$, an error memory 16 for storing the difference between the multi-valued image signal $I(x,y)$ and the binary image signal $P(x,y)$ as an error signal $E(x,y)$, an error diffusion coefficient memory 18 (memory means) for storing an error diffusion coefficient $W(k,l)$ by which the error signal $E(x,y)$ is to be multiplied, a weighting coefficient generator 20 (weighting coefficient generating means) for generating a weighting coefficient $f(I(x,y))$ depending on the multi-valued image signal $I(x,y)$, and a random number generator 22 (random number generating means) for generating a random number $R(x,y)$ by which the weighting coefficient $f(I(x,y))$ is to be multiplied. In FIG. 1, "x" represents the position of a pixel in a main scanning direction, and "y" represents the position of the pixel in an auxiliary scanning direction.

The error signal $E(x,y)$ is determined as the difference between the multi-valued image signal $I(x,y)$ and the binary image signal $P(x,y)$ by a subtractor 24 (error signal calculating means). The error signal $E(x,y)$ and the error diffusion coefficient $W(k,l)$ are multiplied and added by a sum-of-products calculator 26, which outputs the result to an adder 28. To the adder 28, there is also supplied a signal from a multiplier 30 which represents the product of the weighting coefficient $f(I(x,y))$ and the random number $R(x,y)$. The adder 28 supplies an output signal which is added to the multi-valued image signal $I(x,y)$ by an adder 32.

Operation of the error diffusing circuit 10 will be described below.

A multi-valued image signal $I(x,y)$ is stored in the multi-valued image memory 12 and then supplied through the adder 32 to the comparator 14. The comparator 14 compares the multi-valued image signal $I(x,y)$ with a threshold signal TH to produce a binary image signal $P(x,y)$. The relationship between the multi-valued image signal $I(x,y)$ and the binary image signal $P(x,y)$ is expressed as follows:

$$P(x,y) = \begin{array}{l} 0 \; (I(x,y) < TH) \\ 1 \; (I(x,y) \geq TH) \end{array} \quad (3)$$

The binary image signal $P(x,y)$ outputted from the comparator 14 is supplied to the subtractor 24, which determines an error signal $E(x,y)$ represented by:

$$E(x,y)=I(x,y)-P(x,y) \quad (4)$$

The error signal $E(x,y)$ is stored in the error memory 16. In the calculation of the equation (4), if the multi-valued image signal $I(x,y)$ is of 8-bit data, then the binary image signal $P(x,y)$ is converted into 8-bit data according to the following equation (3'):

$$P(x,y) = \begin{matrix} 0 & (I(x,y) < TH) \\ 255 & (I(x,y) \geq TH) \end{matrix} \qquad (3')$$

The error signal E(x,y) stored in the error memory 16 and an error diffusion coefficient W(k,l) stored in the error diffusion coefficient memory 18 are multiplied and added with respect to parameters (k,l) by the sum-of-products calculator 26, which produces a diffusion error signal ΔE(x,y) expressed by the following equation (5):

$$\Delta E(x,y) = \overset{k}{\Sigma} \overset{l}{\Sigma} W(k,l) \cdot E(x-k, y-l) \qquad (5)$$

The parameters (k,l) specify the position of any one of pixels surrounding the pixel which is indicated by (x,y).

Figure 2:
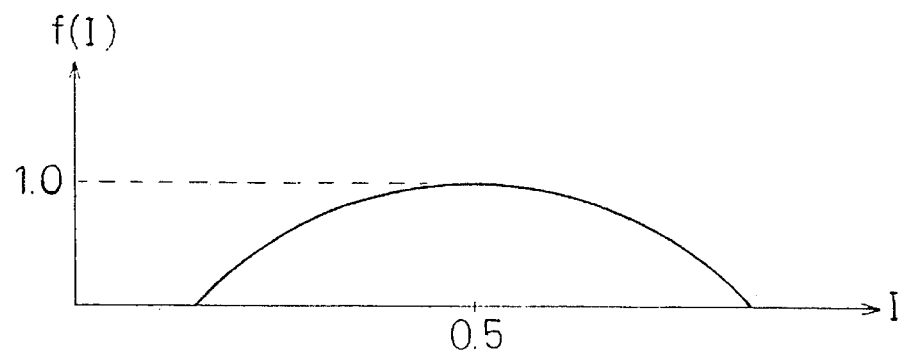
FIG. 2 is a diagram illustrative of a weighting coefficient established by a weighting coefficient generator in the error diffusing circuit shown in FIG. 1.

A random number R(x,y) generated by the random number generator 22 and a weighting coefficient f(I(x,y)) generated by the weighting coefficient generator 20 are multiplied by the multiplier 30, and the product is added by the adder 38 to the diffusion error signal ΔE(x,y) which is supplied to the adder 28. As shown in FIG. 2, the weighting coefficient f(I(x,y)) is established such that the contribution of the random number R(x,y) is smaller in higher- and lower-density regions of the multi-valued image signal I(x,y) and greater in a medium-density region of the multi-valued image signal I(x,y). The adder 28 supplies an output signal to the adder 32, which adds the supplied output signal to the multi-valued image signal I(x,y). The multi-valued image signal I(x,y) is thus corrected as follows:

$$I(x,y) = I(x,y) + \Delta E(x,y) + f(I(x,y)) \cdot R(x,y) \qquad (6)$$

The corrected multi-valued image signal I(x,y) is then compared with the threshold signal TH by the comparator 14, which outputs a binary image signal P(x,y).

The periodicity of the error diffusion coefficient W(k,l) used to produce the diffusion error signal ΔE(x,y) is lessened by applying the random number R(x,y) to the multivalued image signal I(x,y). Because the random number R(x,y) is weighted by the weighting coefficient f(I(x,y)) shown in FIG. 2 depending on the multi-valued image signal I(x,y), the texture of the image is lowered in visibility in the medium-density region and the image suffers no coarseness in the higher- and lower-density regions. The error of the multi-valued image signal I(x,y) is diffused based on other nearby multi-valued image signals in a position range of (x−k, y−l), resulting in the production of a good binary image signal P(x,y) free of moiré patterns or the like.

Figure 3:
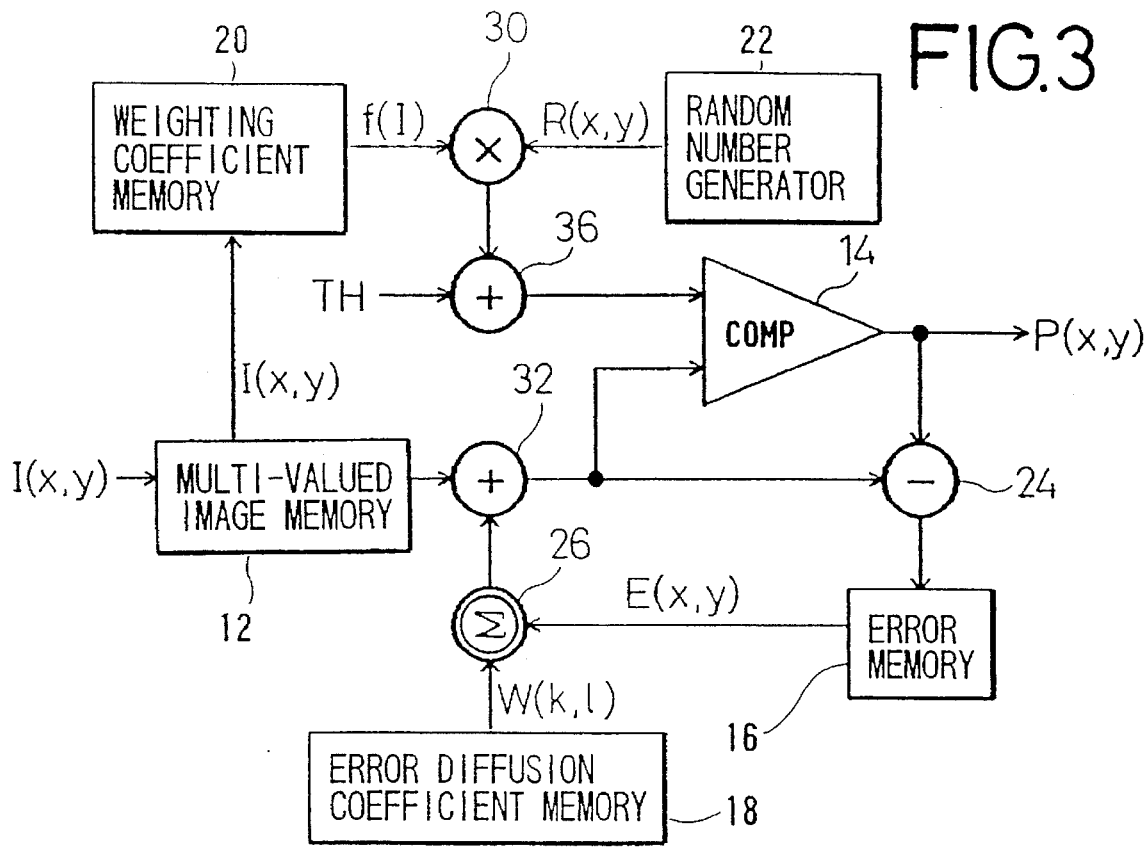
FIG. 3 is a block diagram of an error diffusing circuit in an apparatus for binarizing an image signal according to another embodiment of the present invention.

As shown in FIG. 3, the weighting coefficient f(I(x,y)) from the weighting coefficient generator 20 and the random number R(x,y) from the random number generator 22 may be multiplied by the multiplier 30, and the product from the multiplier 30 may be added to the threshold signal TH by an adder 36. With the arrangement shown in FIG. 3, the multi-valued image signal I(x,y) is corrected as follows:

$$I(x,y) = I(x,y) + \Delta E(x,y) \qquad (7)$$

The binary image signal P(x,y) can be determined as follows:

$$P(x,y) = \begin{matrix} 0 & (I(x,y) < TH + f(I(x,y)) \cdot R(x,y)) \\ 1 & (I(x,y) \geq TH + f(I(x,y)) \cdot R(x,y)) \end{matrix} \qquad (8)$$

Figure 4:
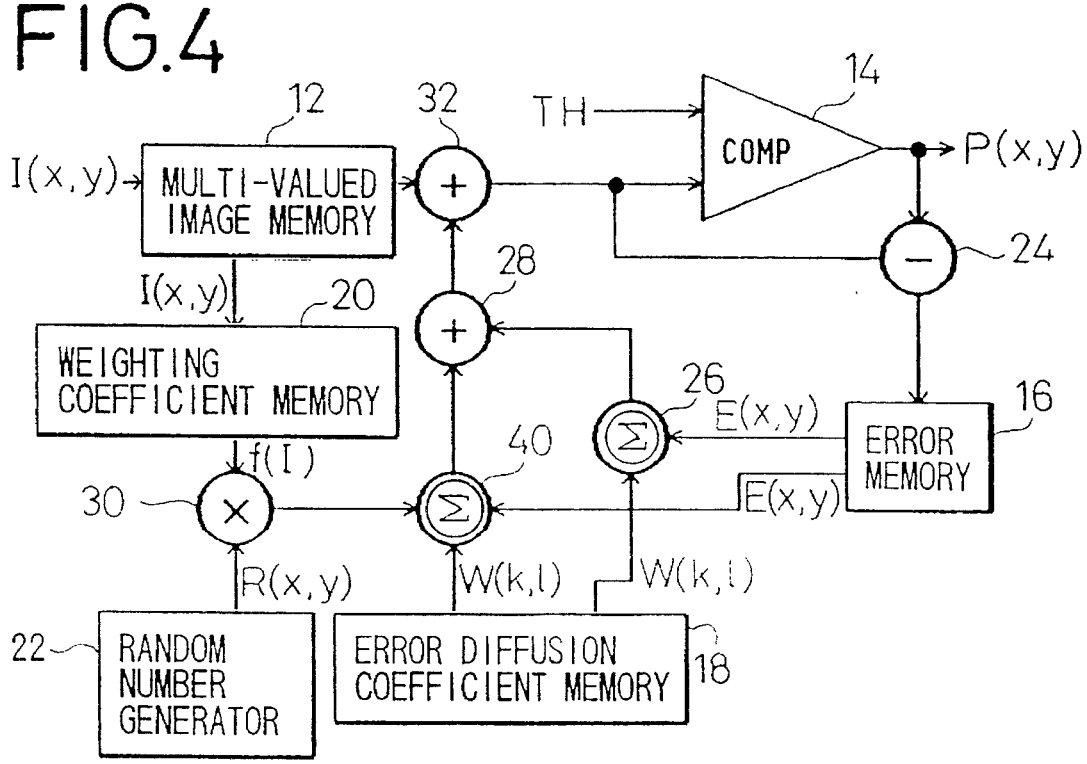
FIG. 4 is a block diagram of an error diffusing circuit in an apparatus for binarizing an image signal according to still another embodiment of the present invention.

Alternatively, as shown in FIG. 4, the error signal E(x,y), the error diffusion coefficient W(k,l), and the product from the multiplier 30 in which the weighting coefficient f(I(x,y)) and the random number R(x,y) are multiplied, are multiplied and added by a sum-of-products calculator 40, and the results may be supplied to the adder 28. In addition, the error signal E(x,y) and the error diffusion coefficient W(k,l) are multiplied and added by the sum-of-products calculator 26, and the results are also supplied to the adder 28. With the arrangement shown in FIG. 4, the diffusion error signal ΔE(x,y) is expressed by:

$$\Delta E(x,y) = \overset{k}{\Sigma} \overset{l}{\Sigma} (1 + f(I(x,y)) \cdot R(x,y)) \cdot W(k,l) \cdot E(x-k, y-l) \qquad (9)$$

The multi-valued image signal I(x,y) is determined by substituting the equation (9) in the equation (7), and the binary image signal P(x,y) is determined according to the equation (3).

Figure 5:
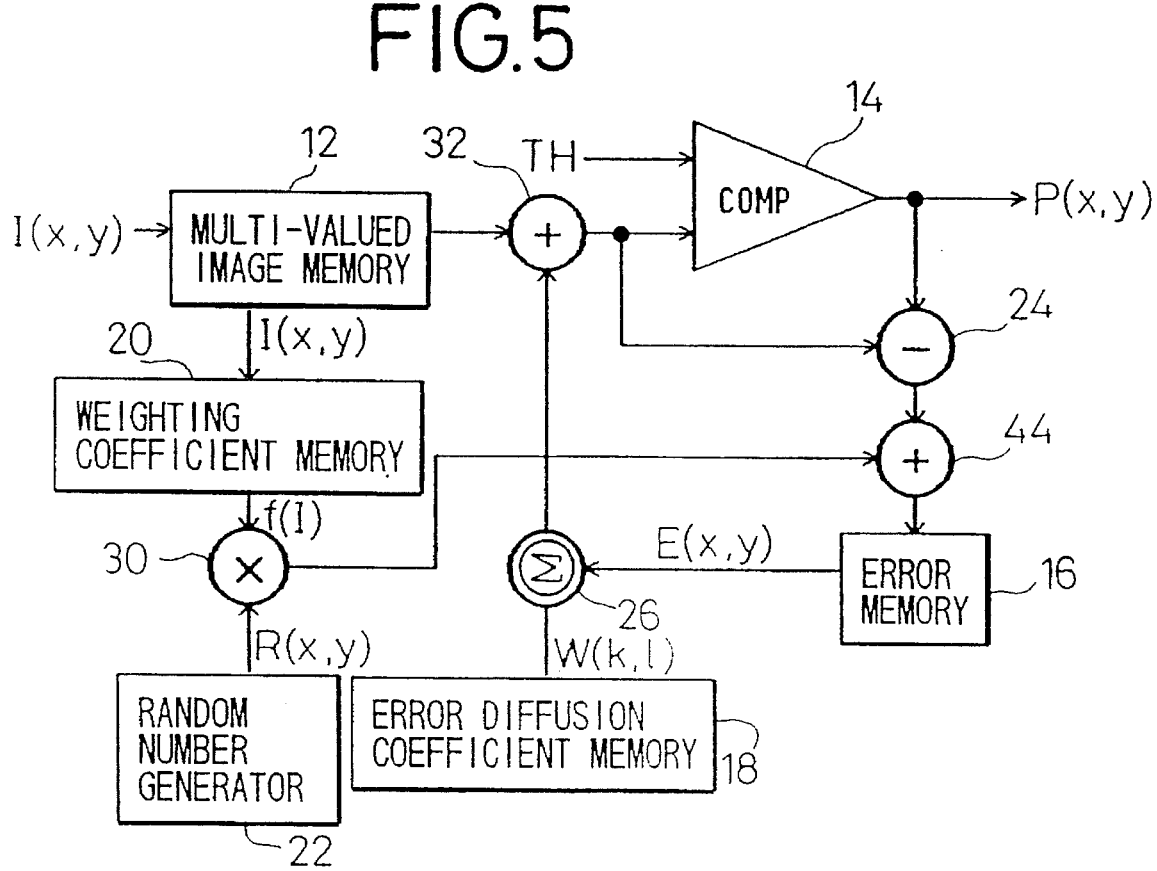
FIG. 5 is a block diagram of an error diffusing circuit in an apparatus for binarizing an image signal according to a further embodiment of the present invention.

Further alternatively, as shown in FIG. 5, the weighting coefficient f(I(x,y)) from the weighting coefficient generator 20 and the random number R(x,y) from the random number generator 22 may be multiplied by a multiplier 30, and the product from the multiplier 30 may be added to the error signal E(x,y) by an adder 44. The error signal E(x,y) is expressed by:

$$E(x,y) = I(x,y) - P(x,y) + f(I(x,y)) \cdot R(x,y) \qquad (10)$$

The multi-valued image signal I(x,y) is determined by substituting the equation (10) in the equations (5) and (7), and the binary image signal P(x,y) is determined according to the equation (3).

Although certain preferred embodiments of the present invention has been shown and described in detail, it should be understood that various changes and modifications may be made therein without departing from the scope of the appended claims.

What is claimed is:

1. An apparatus for producing a binary gradation image signal from a continuous gradation image signal, comprising:

a comparing means for comparing a multi-value image signal corresponding to a target pixel with a threshold signal to produce a binary image signal;

an error calculating means for determining an error signal based on a difference between said multi-valued image signal and said binary image signal;

an error diffusion means for determining a set of error diffusion signals based on said error signal and a set of error diffusion coefficients, and applying said error diffusion signals to pixels proximate to said target pixel;

a random number generating means for generating a random number;

a weighting coefficient generating means for generating a weighting coefficient whose value varies depending on a density value of an input multi-valued image signal; and a weighting means for multiplying said random number by said weighting coefficient;

wherein the random number weighted by said weighting coefficient is applied to at least one of: said error signal, said error diffusion signals, and said threshold signal.

2. An apparatus according to claim 1, further comprising: an adding means for adding the weighted random number to said error signal.

3. An apparatus according to claim 1, further comprising: a product summing means for producing the sum of products, between the error diffusion coefficients and the weighted random number.

4. An apparatus according to claim 1, further comprising: an adding means for adding the weighted random number to the result of said error diffusion process.

5. An apparatus according to claim 1, further comprising: an adding means for adding the weighted random number to said threshold signal.

6. A method of producing a binary gradation image signal from a continuous gradation image signal, comprising the steps of:

comparing a multi-valued image signal corresponding to a target pixel with a threshold signal to produce a binary image signal;

determining an error signal based on a difference between said multi-valued image signal and said binary image signal;

determining a set of error diffusion signals based on said error signal and a set of error diffusion coefficients;

applying said error diffusion signals to pixels proximate said target pixel thereby to carry out an error diffusion process;

generating a random number;

generating a weighting coefficient whose value varies depending on a density value of an input multi-valued image signal;

weighting said random number with said weighting coefficient; and applying the random number weighted by said weighting coefficient to at least one of said error signal, said error diffusion signals, and said threshold signal.

7. A method according to claim 6, further comprising the step of adding the weighted random number to said error signal.

8. A method according to claim 6, further comprising the step of producing the sum of products between the error diffusion coefficients and the weighted random number.

9. A method according to claim 6, further comprising the step of adding the weighted random number to the result of said error diffusion process.

10. A method according to claim 6, further comprising the step of adding the weighted random number to said threshold signal.

* * * * *